United States Patent [19]

Ishiwata et al.

[11] Patent Number: 4,873,590
[45] Date of Patent: Oct. 10, 1989

[54] MAGNETIC RECORDING AND REPRODUCING APPARATUS

[75] Inventors: Tetsuo Ishiwata, Suita; Katsuyuki Taguchi, Hirakata, both of Japan

[73] Assignee: Matsushita Electric Industrial Co., Ltd., Osaka, Japan

[21] Appl. No.: 162,102

[22] Filed: Feb. 29, 1988

[30] Foreign Application Priority Data

Feb. 27, 1987 [JP] Japan .................................. 62-45593

[51] Int. Cl.$^4$ ............................................. G11B 15/96
[52] U.S. Cl. .................................................. 360/73.14
[58] Field of Search ..................... 360/73, 73.01, 73.09, 360/17.14

[56] References Cited

U.S. PATENT DOCUMENTS 4,347,538 8/1982 Klank .
4,696,439 9/1987 Sakigara ........................... 360/73.14

FOREIGN PATENT DOCUMENTS 0063646 11/1982 European Pat. Off. .
0216260 4/1987 European Pat. Off. .
3412735 10/1985 Fed. Rep. of Germany .
2157054A 10/1985 United Kingdom .

Primary Examiner—A. J. Heinz
Attorney, Agent, or Firm—Wenderoth, Lind & Ponack

[57] ABSTRACT

A magnetic recording and reproducing apparatus includes a control device for monitoring a take-up reel, a feed reel, and a capstan motor for rotational speed and direction. By monitoring the take-up reel, feed reel and capstan motor, the control device determines if the apparatus is operating properly. Based on the determinations regarding the proper operation of the apparatus, the control device controls the operation of the capstan motor and the shifting of the idler gear between a first operational state and a second idle state.

2 Claims, 3 Drawing Sheets

MAGNETIC RECORDING AND REPRODUCING APPARATUS

BACKGROUND OF THE INVENTION

The present invention relates to a magnetic tape driving portion of a magnetic recording and reproducing apparatus.

A block diagram of a tape driving system of a conventional magnetic recording and reproducing apparatus is shown in FIG. 4. 14 is an idler gear, 15 is a driving gear, 16 is a capstan motor, 17 is a feed reel, 18 is a take-up reel, 19 is an FG pulse generating portion of the feed reel, 20 is an FG pulse generating portion of the take-up reel, 21 is a control portion, 22 is a servomechanism portion, 23 is a driving portion at idler gear position, and 24 is an FG pulse generating portion of the capstan motor 16.

Operation of a driving system of the above constitution such as shown in FIG. 4 will hereafter be explained. When the driving system is being shifted from a state of stop of a tape to a state of quick forward driving and rewinding of a tape, the idler gear 14 is caused to be in contact with the driving gear 15 which is driven by the capstan motor 16. When the driving system is being shifted from a state of stop of a tape to a state of quick forward driving of a tape by the rotational direction of the driving gear 15, the idler gear 14 rotates in contact with the take-up reel 18, and when it is being shifted from a state of stop of a tape to a state of rewinding of a tape by the rotational direction of the driving gear 15, the idler gear 14 rotates in contact with the feed reel 17 so as to feed the tape into rewinding direction.

However, in a method such as that described above, the time required to change the rotational direction of the capstan motor 16 is indefinite and it is necessary to allow for a sufficiently long waiting period until the rotational direction has changed completely, which in turn results in that it takes a long time to shift from a state of stop of a tape to a state of quick forward driving or rewinding of a tape. If an attempt is made to reduce this shifting time by shortening the waiting time necessary to complete the changing of the rotational direction of the capstan motor 16, the idler gear 14 comes in contact with the driving gear 15 before the rotational direction of the capstan motor 16 has completely changed, causing the idler gear 14 to come into rotating contact with a reel on the opposite side of a desired reel (this state is hereafter referred to as the reverse rotating contact). Alternatively, even if the rotational direction of the capstan motor 16 is correct, there was an inconvenience in that defective operation of a mechanical portion sometimes causes locking of the idler gear 14 and the driving gear 15 or the reverse rotating contact.

BRIEF SUMMARY OF THE INVENTION

In view of problems of the above conventional apparatus, an object of the present invention is to provide a magnetic recording and reproducing apparatus which is capable of preventing the reverse rotating contact or mechanical locking while an idler gear is caused to come into rotating contact with a reel.

In order to achieve the object of the present invention, the magnetic recording and reproducing apparatus of the present invention comprises two reels which drive the hub of a cassette half, that is, a feed reel and a take-up reel, a capstan motor which generates a driving force, a driving gear which is driven by said capstan motor, an idler gear which assumes two positions, one of which is a state wherein the idler gear is in contact with said driving gear and the other of which is a state wherein the idler gear is not in contact with said driving gear, and when it is shifted from a state wherein the idler gear is not in contact with the driving gear to a state wherein the idler gear is in contact with the driving gear, said idler gear is caused to come into rotating contact with a feed reel or a take-up reel according to the rotational direction of the driving gear, a driving portion at idler gear position which shifts the position of said idler gear, a capstan FG generating portion which generates pulses of a period according to the rotational speed of said capstan motor, that is a capstan FG, FG generating portions of two reels which generate pulses of a period according to the rotational speed of said two reels, that is, a feed reel FG and a take-up reel FG, a servomechanism portion which controls the rotation of said capstan motor by using said capstan FG or reel FG, a servo locking detecting portion which detects servo locking of said servomechanism portion, a capstan rotational direction detecting portion which detects the rotational direction of said capstan motor, and a control portion which confirms by said reel FG that the rotating contact of the idler gear is completed, detects faulty rotational contact if any, and outputs to said servomechanism portion and driving portion at idler gear position an instruction to try an operation of rotating contact again.

According to the above constitution, when the idler gear is in rotating contact with a reel, the control portion detects that FG pulses of both reels are generated, that is, both reels are rotating, so as to confirm that the rotating contact has normally been completed. In the case where FG pulses of only one reel are generated, that is, only one reel is rotating, or in the case where FG pulses of neither reel are not generated, that is, neither reel is rotating, it is judged that the faulty rotating contact of the idler gear has occurred, and a command is issued to the driving portion at idler gear position to return the idler gear to a position where the idler gear does not contact the driving gear, so that the operation of rotating contact is caused to be attempted again.

DETAILED DESCRIPTION

An embodiment of the present invention will hereafter be explained with reference to the drawings.

Figure 1:
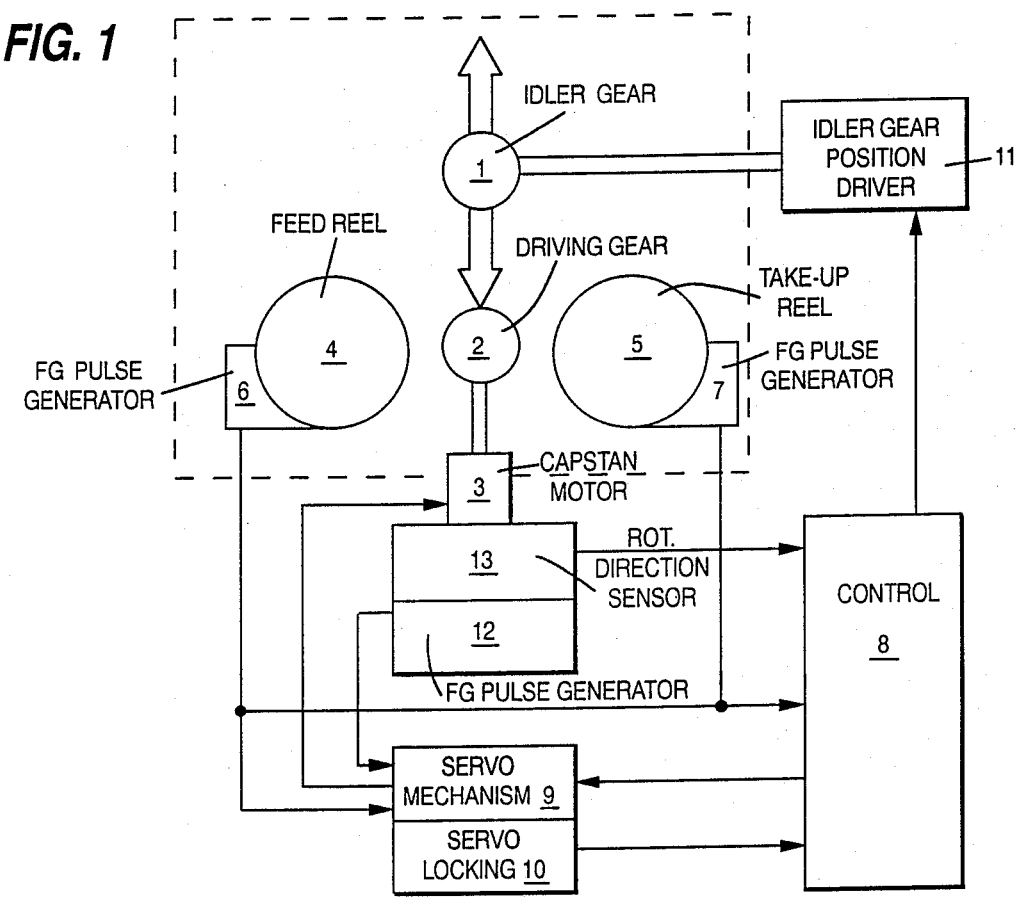
FIG. 1 is a block diagram of the components of the magnetic recording and reproducing apparatus of the present invention.
Figure 4:
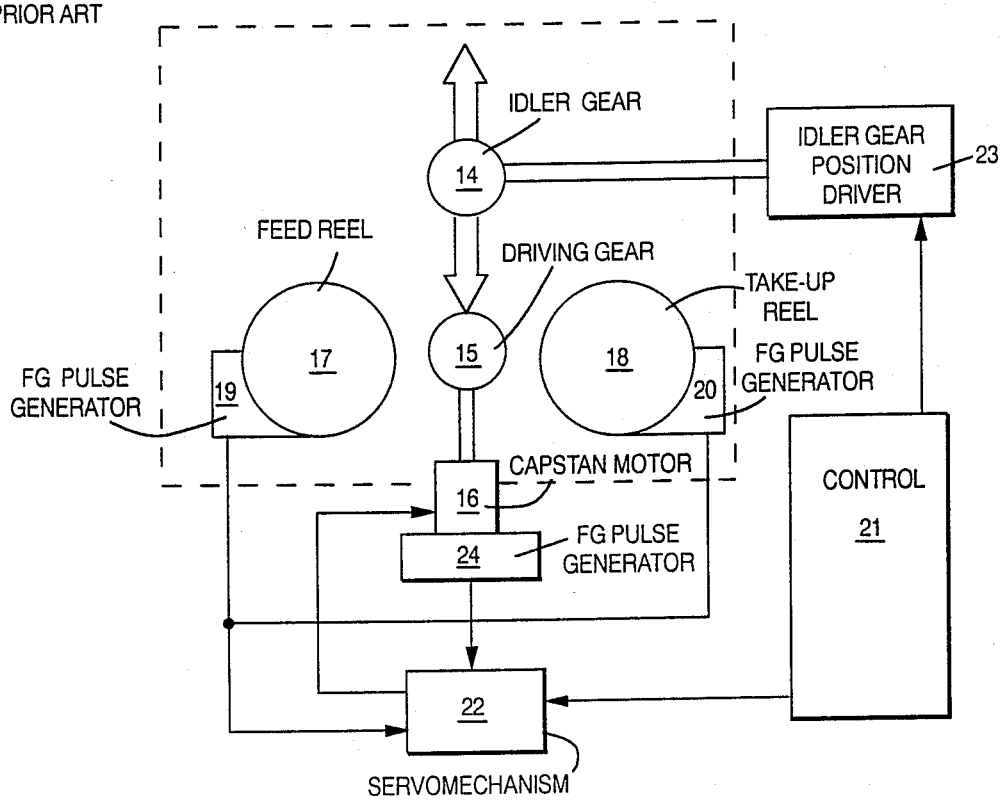
FIG. 4 is a block diagram of the components of a conventional apparatus.

FIG. 1 is a block diagram showing the parts of an embodiment of a magnetic recording and reproducing apparatus of the present invention.

1 is an idler gear which shifts idler gear positions by means of a driving portion between a state wherein the idler gear 1 contacts a driving gear 2 and a state wherein the idler gear does not contact a driving gear 2, 2 is a driving gear which is driven by a capstan motor, 3 is a capstan motor, 4 is a feed reel, 5 is a take-up reel, 6 is an FG pulse generating portion of the feed reel, 7 is an FG pulse generating portion of the take-up reel, 8 is a control portion, 9 is a servo-mechanism portion which receives a command from the control portion 8 and controls the capstan motor 3, 10 is a servo locking detecting portion which detects whether the capstan servo is effected, 11 is a driving portion at idler gear position which shifts the idler gear position according to the command given from the control portion 8, 12 is a capstan FG pulse generating portion, and 13 is a capstan rotational direction detecting portion.

Figure 2:
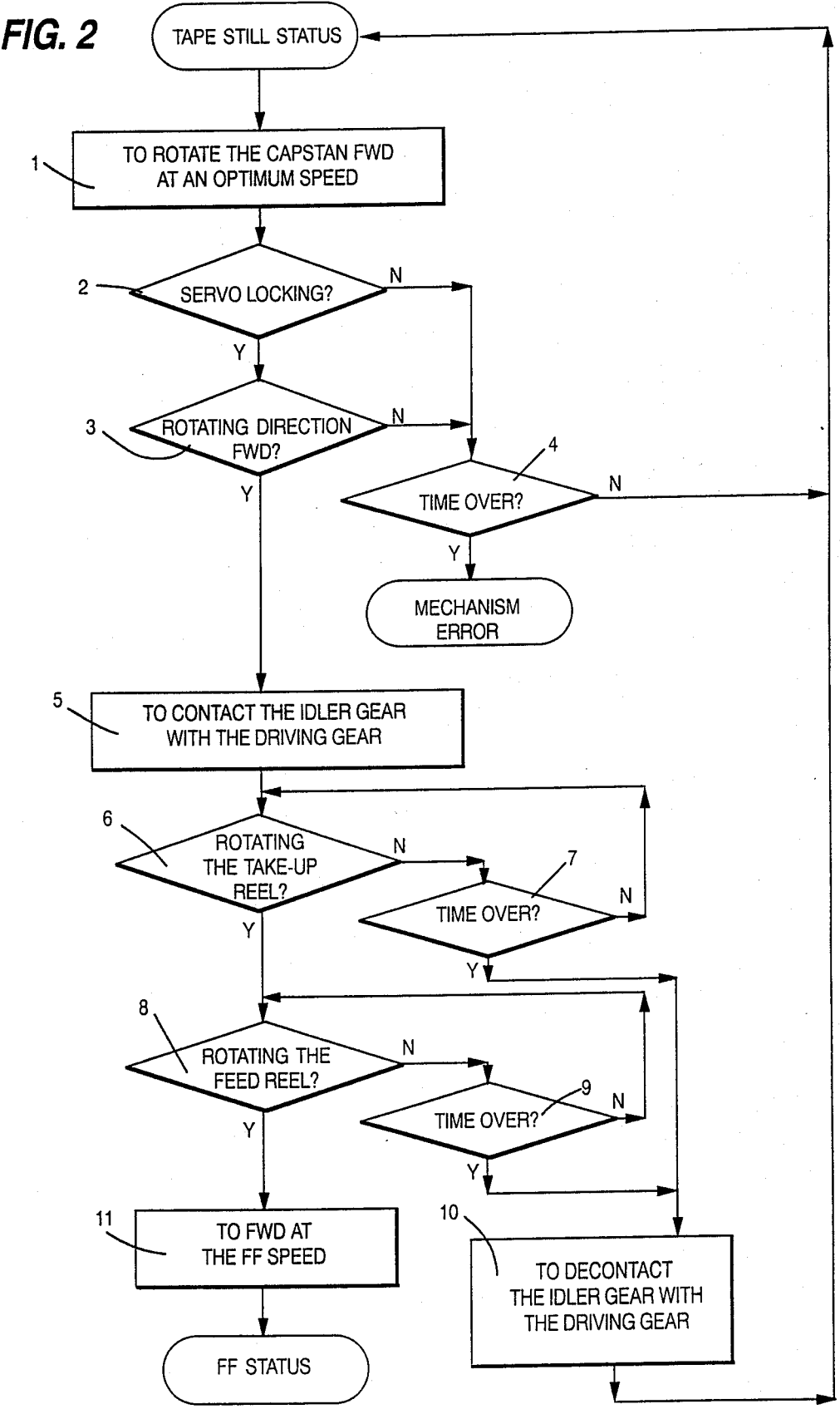
FIGS. 2 and 3 are flowcharts showing the operation of the magnetic recording and reproducing apparatus of the present invention.
Figure 3:
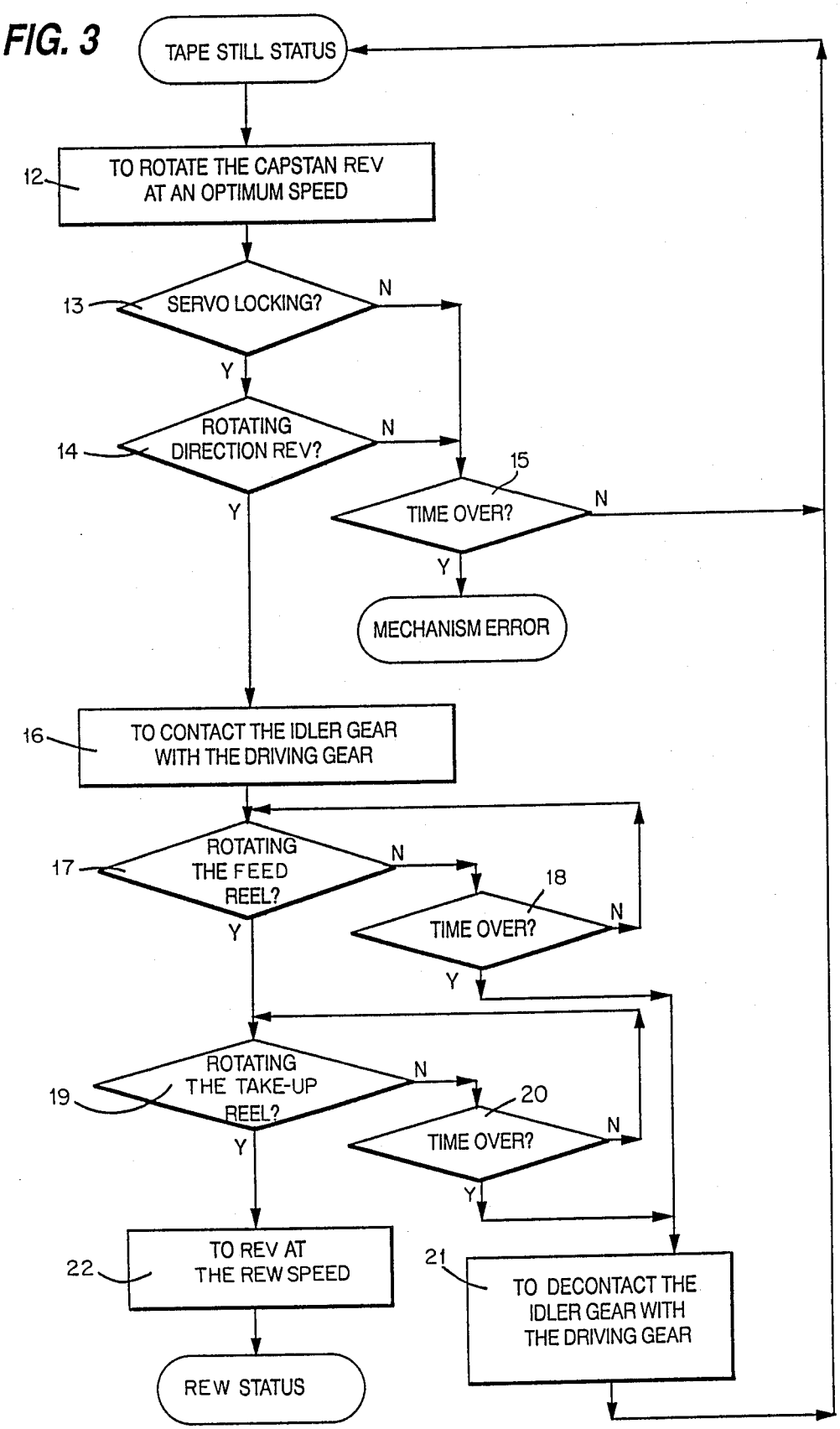

FIG. 2 and FIG. 3 are flowcharts showing operating steps of the magnetic recording and reproducing apparatus of the embodiment shown in FIG. 1, FIG. 2 is a flowchart showing a shift from a state of stop of a tape to a state of FF, and FIG. 3 is a flowchart showing a shift from a state of stop of a tape to a state of REW.

In step 1, the control portion 8 instructs the servomechanism portion 9 to cause the capstan motor 3 to rotate at an optimum speed for rotating contact of the idler gear 1 and instructs the rotational direction as well. In step 2, the control portion 8 observes an output of the servo locking detecting portion 10 and confirms that the speed agrees with an instruction given in the step 1, and the step 2 returns to the step 1 while the servo is not locked and keeps giving instructions to the servo. In step 3, the control portion 8 observes an output of the capstan rotational direction detecting portion 13 and confirms that the capstan rotation is in FWD (forward) direction, and if the direction is not FWD direction, the step 3 returns to the step 1 and keeps giving directions to the servomechanism portion 9. If the output of the capstan locking is not given over a certain length of time or if the rotational direction is not in FWD direction over a certain length of time, such condition is judged by the step 4, which in turn processes such condition a sa faulty servo operation or a fauly mechanical operation. In step 5, the control portion 8 gives an instruction to the driving portion at idler gear position 11 to cause the idler gear 1 to contact with the driving gear 2. In step 6, it is confirmed by monitoring the take-up reel FG pulses whether the take-up reel 5, that is, a shift to a state of FF, causes the reel with which the idler gear 1 is to come in rotating contact starts rotating. If the take-up reel 5 does not rotate within a certain length of time, the step 7 detects such condition and advances to step 10. In step 8, the feed reel 4 is confirmed as having started its rotation by the idler gear 1 which comes in rotating contact with the take-up reel 5 so that a tape is wound up by the take-up reel 5, and if the feed reel 4 does not start rotating within a certain length of time, the step 8 detects such condition and advances to step 10. In step 10, the control portion 8 gives a command to the driving portion at idler gear position to shift into a direction so as to cause the idler gear 1 to be kept away from the driving gear 2, so that the step 10 returns to the step 1 to thereby try the operation of rotating contact again. If both reels have rotated, the speed of FF (about 50 to 500 times the optimum speed of rotating contact) is instructed in step 11. Likewise, the shift to REW is performed according to the flow of the flowchart shown in FIG. 3.

As stated above, according to the embodiment of the present invention, when shifting from a state of stop of a tape to a state of FF or REW, it is possible to detect faulty rotating contact caused by the reverse rotating contact or mechanical locking of the idler gear 1 and to try the shifting operation again. Furthermore, since there is no waiting period after a command for optimum speed of rotating contact and a command for direction are issued because the servo locking and rotational direction are checked, it is possible to absorb the variation of the capstan and mechanism of the driving system so that it becomes possible to reduce the shifting time. If the tape is slackened when shifted to FF and REW, because the tape will be wound up until both reels start rotating at an optimum speed (at low speed) of rotating contact, that is until the tap slackness is eliminated, an advantage effect results in that the tape is not damaged.

As described above, a magnetic recording and reproducing apparatus of the present invention comprises a capstan FG generating portion which generates pulses according to the rotation of the capstan motor, a capstan rotational direction detecting portion, FG generating portions of two reels which causes the reel FG pulses to be generated according to the rotation of said two reels, a servo locking detecting portion which detects the locking of the servomechanism portion, said servomechanism portion which confirms by said reel FG that the rotating contact of the idler gear has been completed, detects any faulty rotating contact, and gives a command to try the operation of rotating contact again, and a control portion which outputs to a driving portion at idler gear position, and it is possible to realize an excellent magnetic recording and reproducing apparatus which is capable of detecting faulty rotating contact caused by the reverse rotating contact and mechanical locking of the idler gear when the state of stop of a tape shifts to a state of FF or REW and is also capable of trying the shifting operation again.

We claim:

1. A magnetic recording and reproducing apparatus comprising:

a feed reel and a take-up reel which drive a hub of a cassette half;

a capstan motor for generating a driving force;

a driving gear driven by said capstan motor;

an idler gear which is selectively positioned in one of a first state and a second state, said first state being a position wherein said idler gear is in rotational contact with said driving gear, and said second state being a position wherein said idler is disengaged from said driving gear, and a means for selectively coupling said drive gear with said feed reel and take-up reel whereby said feed reel and said take-up reel rotate according to a rotation of said driving gear when said idler gear is in said first state;

a idler gear position driving means for shifting said idler gear between said first and second states;

a capstan FG pulse generating means for generating a capstan FG pulse according to a rotational speed of said capstan motor;

a feed reel FG pulse generating means for generating a feed reel FG pulse according to a rotational speed of side feed reel;

a take-up reel FG pulse generating means for generating a take-up reel FG pulse according to a rotational speed of said take-up reel;

a servomechanism means for controlling rotation of said capstan motor;

a servo locking detection means coupled to said capstan FG pulse generating means for detecting a servo locking of said servomechanism means when said capstan has attained a predetermined speed;

a capstan rotational direction detecting means for detecting a rotational direction of said capstan motor; and a control means coupled to said idler gear position driving means, said feed reel FG pulse generating means, said take-up reel FG pulse generating means, said servomechanism means, said servo locking detecting means, and said capstan rotational direction detecting means, wherein said control means monitors said feed reel FG pulses and said take-up reel FG pulses to determine if said feed reel and said take-up reel are properly rotating when said idler gear is in said first state, and wherein said control means causes said idler gear position driving means to shift said idler gear from said first state to said second state and then back to said first state when said control means determines that at least one of said feed reel and said take-up reel are not rotating properly when said idler gear is in said first state.

2. A magnetic recording and reproducing apparatus as claimed in claim 3, wherein said control means causes said servomechanism means to rotate said capstan motor in a rotational direction and at an optimum rotational speed, and wherein said control means monitors an output of said servo locking detection means to confirm said optimum rotational speed of said capstan motor and monitors an output of said capstan rotational direction detecting means to confirm said rotational direction of said capstan motor, and wherein said control means causes said idler gear position driving means to shift said idler gear to said first state after confirmation of said rotational speed and direction of said capstan motor.

* * * * *